United States Patent
Horita

(10) Patent No.: US 9,524,754 B2
(45) Date of Patent: Dec. 20, 2016

(54) VIDEO PLAYBACK DEVICE AND VIDEO RECORDING DEVICE

(71) Applicant: Panasonic Corporation, Osaka (JP)

(72) Inventor: Seiji Horita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 71 days.

(21) Appl. No.: 14/198,952

(22) Filed: Mar. 6, 2014

(65) Prior Publication Data

US 2015/0170710 A1    Jun. 18, 2015

(30) Foreign Application Priority Data

Dec. 16, 2013    (JP) .................................. 2013-258917

(51) Int. Cl.
| | | |
|---|---|---|
| H04N 9/80 | (2006.01) | |
| G11B 27/00 | (2006.01) | |
| G11B 27/10 | (2006.01) | |
| G11B 27/19 | (2006.01) | |
| G11B 27/026 | (2006.01) | |
| H04N 5/77 | (2006.01) | |
| H04N 9/82 | (2006.01) | |
| H04N 5/93 | (2006.01) | |

(52) U.S. Cl.
CPC .......... *G11B 27/105* (2013.01); *G11B 27/026* (2013.01); *G11B 27/19* (2013.01); *H04N 5/77* (2013.01); *H04N 9/8233* (2013.01)

(58) Field of Classification Search
CPC .............. H04N 9/80; H04N 5/93; G11B 27/00
USPC ........ 386/241, 239, 248, 278, 280, 282, 288
See application file for complete search history.

(56) References Cited

U.S. PATENT DOCUMENTS

| | | | |
|---|---|---|---|
| 2002/0106191 A1* | 8/2002 | Betz et al. ..................... | 386/70 |
| 2005/0038794 A1* | 2/2005 | Piersol .......................... | 707/100 |
| 2005/0220279 A1* | 10/2005 | Schipper et al. ............... | 379/68 |
| 2007/0242928 A1* | 10/2007 | Tanabe ........................... | 386/83 |
| 2009/0180702 A1* | 7/2009 | Bordes ................... | H04N 19/70 |
| | | | 382/239 |

(Continued)

FOREIGN PATENT DOCUMENTS

| | | |
|---|---|---|
| JP | 62-214770 | 9/1987 |
| JP | 07-067066 | 3/1995 |

(Continued)

*Primary Examiner* — Daquan Zhao
(74) *Attorney, Agent, or Firm* — Renner, Otto, Boisselle & Sklar, LLP

(57) ABSTRACT

A system is provided for transmitting a video played back from a video recording medium which stores the video and additional information without loss of an association between the video and the additional information even when a remote pickup unit (RPU) is employed for the transmission A video playback device plays back videos while repeatedly converting the content of an additional information file associated with a video file to be played back or ID information of the video file into a two-dimensional code, and inserting the two-dimensional code over a predetermined length before the video. A video recording device which receives a video from the video playback device detects a two-dimensional code inserted in the video, and stores the content of the two-dimensional code as an additional information file into its own recording medium in association with the video.

7 Claims, 10 Drawing Sheets

(56) References Cited

U.S. PATENT DOCUMENTS

2012/0304224 A1* 11/2012 Hines .............................. 725/34
2013/0321554 A1* 12/2013 Martinsen et al. ........ 348/14.02

FOREIGN PATENT DOCUMENTS

| JP | 2007-074495 | 3/2007 |
| JP | 2007-082088 | 3/2007 |
| JP | 2007-266843 | 10/2007 |

* cited by examiner

FIG.6A

```xml
<?xml version="1.0"?>
<P2Main>
 <ClipContent>
   <ClipName>001010</ClipName>
   <GlobalClipID>
     060A2B340101010501010D4313000000AB935E77616505D100804
     58200000002
   </GlobalClipID>
   <Duration>118</Duration>
   <EditUnit>1001/30000</EditUnit>
   <EssenceList>
     <Video ValidAudioFlag="false">
       <VideoFormat>MXF</VideoFormat>
       <Codec>DV100_1080/59.94i</Codec>
       <FrameRate DropFrameFlag="true">59.94i</FrameRate>
       <StartTimecode>16:05:59:27</StartTimecode>
       <StartBinaryGroup>270F6003</StartBinaryGroup>
       <AspectRatio>16:9</AspectRatio>
       <VideoIndex>
         <StartByteOffset>32768</StartByteOffset>
         <DataSize>56640000</DataSize>
       </VideoIndex>
     </Video>
     <Audio>
       <AudioFormat>MXF</AudioFormat>
       <SamplingRate>48000</SamplingRate>
       <BitsPerSample>16</BitsPerSample>
       <AudioIndex>
         <StartByteOffset>32768</StartByteOffset>
         <DataSize>377976</DataSize>
       </AudioIndex>
     </Audio>
   </EssenceList>
```

FIG.6B

```
<ClipMetadata>
  <DataSource>SHOOTING</DataSource>
  <Access>
    <CreationDate>2013-09-26T11:35:22+00:00</CreationDate>
    <LastUpdateDate>2013-09-26T11:35:25+00:00</LastUpdateDate>
  </Access>
  <Device>
    <Manufacturer>Panasonic</Manufacturer>
    <SerialNo.>92TA00001</SerialNo.>
    <ModelName>AG-HPX600MC</ModelName>
  </Device>
  <Shoot>
    <StartDate>2013-09-26T11:32:45+00:00</StartDate>
    <EndDate>2013-09-26T11:32:49+00:00</EndDate>
  </Shoot>
  <Memos>
    <Memo id="0">
      <Offset>82</Offset>
      <Text>President</Text>
    </Memo>
  </Memos>
  </ClipMetadata>
 </ClipContent>
</P2Main>
```

311

VIDEO PLAYBACK DEVICE AND VIDEO RECORDING DEVICE

CROSS-REFERENCE TO RELATED APPLICATION

This application claims priority to Japanese Patent Application No. 2013-258917 filed on Dec. 16, 2013, the entire disclosure of which is incorporated by reference herein.

BACKGROUND

The present disclosure relates to video playback devices which use a recording medium storing a video and additional information associated with the video, and video recording devices which record a video and additional information associated with the video to a recording medium.

For example, Japanese Unexamined Patent Publication No. H07-67066 describes a video recording device which records a video as a file to a recording medium, such as a semiconductor memory device etc.

Such a video recording device which records a video as a file may also record additional information associated with a captured video to a recording medium. Examples of the additional information include technical information about a video compression scheme used in recording the video etc., and information about a subject itself of the video, a place where the video has been captured, etc.

For example, Japanese Unexamined Patent Publication No. 2007-082088 describes a video recording device which records additional information associated with a video in association with the time axis of the video. Specifically, this video recording device includes an additional information input button as additional information input means involved in the user's action. The additional information input button includes three buttons which are provided on a side surface of a camcorder. Of the three buttons, for example, a first button is for registering an important scene, a second button is for switching a mode between a button operation mode and a character input mode, and a third button is for canceling registration. By pressing down the additional information input button when an important scene is encountered during shooting, additional information such as a mark, a text, etc. can be added to the important captured scene. Note that text information may be input by the video recording device recognizing a video or an audio and automatically generating a text corresponding to the video or the audio.

Thus, a marker for an important scene is stored in association with a video. This makes it dramatically easier to pick up important portions from a long video when the video is subsequently edited and used (e.g., only important portions are extracted and used in a news program). When a text is used as additional information, a video can be searched using the additional information, and therefore, the reuse of the video is dramatically facilitated.

Note that the additional information is typically recorded to the same recording medium in which the corresponding video is recorded, in association with the video, by being stored as an eXtensible Markup Language (XML) file or a text file or being embedded as a metadata in a video file.

It is assumed that a video captured by a video recording device is transferred from a place where shooting is performed to another place. For example, during news gathering, a news journalist or reporter from a broadcast station may desire to send a video captured on location to the station soon after shooting.

As described above, additional information is recorded as a text file or metadata in a video file, and therefore, when files recorded in a recording medium are directly transferred, a video and its additional information are transferred to a remote place while an association therebetween is maintained. Specifically, when all files recorded in a recording medium are transferred through Internet access using the File Transfer Protocol (FTP), a video can be transferred without loss of its additional information.

However, in practical situations, it is often difficult to find Internet access whose speed is high enough to transfer a video file having image quality needed by a broadcast station in a practical time, at a remote location. In such circumstances, a video transmission device for a television broadcasting system which is called a remote pickup unit (RPU) or a microwave link is commonly used.

The RPU is a video transmission device which includes a transmitter and a receiver. Ultra-high frequency (UHF) waves or microwaves are used for communication between the transmitter and the receiver. A video (images and sounds) to be transmitted is supplied to the transmitter by directly inputting signals of a video camera, a microphone, etc. to the transmitter through a coaxial cable. In other words, the RPU transmits only images and sounds captured by a video camera to a remote place.

This means that additional information which is added during shooting is lost through the RPU and therefore is not found by the receiver of the video. In other words, due to the use of the RPU, the above benefits (an improvement in search performance, etc.) of the additional information are lost.

SUMMARY

The present disclosure describes implementations of a system in which a video played back from a recording medium which stores the video and additional information can be transmitted without loss of an association between the video and the additional information, even when the transmission is performed using the RPU.

An example video playback device of the present disclosure for playing back a captured video from a recording medium storing the captured video and additional information about the captured video, includes a marker image generator configured to convert the additional information into a marker image showing a marker, the marker being a symbol allowing a computer to read out information embedded therein by image processing, a marker image inserter configured to insert the marker image into a predetermined position in the captured video, and a video sender configured to successively send out the marker image inserted by the marker image inserter and the captured video.

An example video recording device of the present disclosure for dividing a single input video signal into a plurality of video files and recording the plurality of video files, includes a marker detector configured to detect a marker image inserted as an image in the video signal, the marker image showing a marker and the marker being a symbol allowing a computer to read out information embedded therein by image processing, an additional information decoder configured to decode the marker in the marker image detected by the marker detector to extract additional information, a video data separator configured to separate videos before and after the marker image detected by the marker detector, a video data storing unit configured to store the videos separated by the video data separator into a recording medium, an additional information storing unit configured to store the additional information extracted by the additional information decoder into the recording medium, and a file associating unit configured to associate the video and the additional information having a correspondence relationship with each other in the recording medium.

With the above configurations, when the video playback device of the present disclosure is used as a signal source, then even if a transfer device such as representatively an RPU etc. which transfers only a video is employed, additional information associated with the video is not lost in the receiver of the video. When the video recording device of the present disclosure is used by the receiver, then even if a transfer device such as representatively an RPU etc. which transfers only a video is employed, a video file and an additional information file associated with the video file can be produced in the receiver. As a result, a system can be constructed in which benefits (an improvement in convenience during editing, an improvement in search performance, etc.) of the presence of additional information are not lost by the video transfer technique.

BRIEF DESCRIPTION OF THE DRAWINGS

FIG. 6A is a diagram showing an example additional information file according to the first embodiment.

FIG. 6B is a diagram which is a continuation of FIG. 6A.

DETAILED DESCRIPTION

Embodiments will be described in detail hereinafter with reference to the accompanying drawings. To avoid unnecessarily obscuring the present disclosure, well-known features may not be described or substantially the same elements may not be redundantly described, for example. This is for ease of understanding.

The drawings and the following description are provided to enable those skilled in the art to fully understand the present disclosure and are in no way intended to limit the scope of the present disclosure as set forth in the appended claims.

(First Embodiment)
[1-1. System Configuration]

Figure 1:
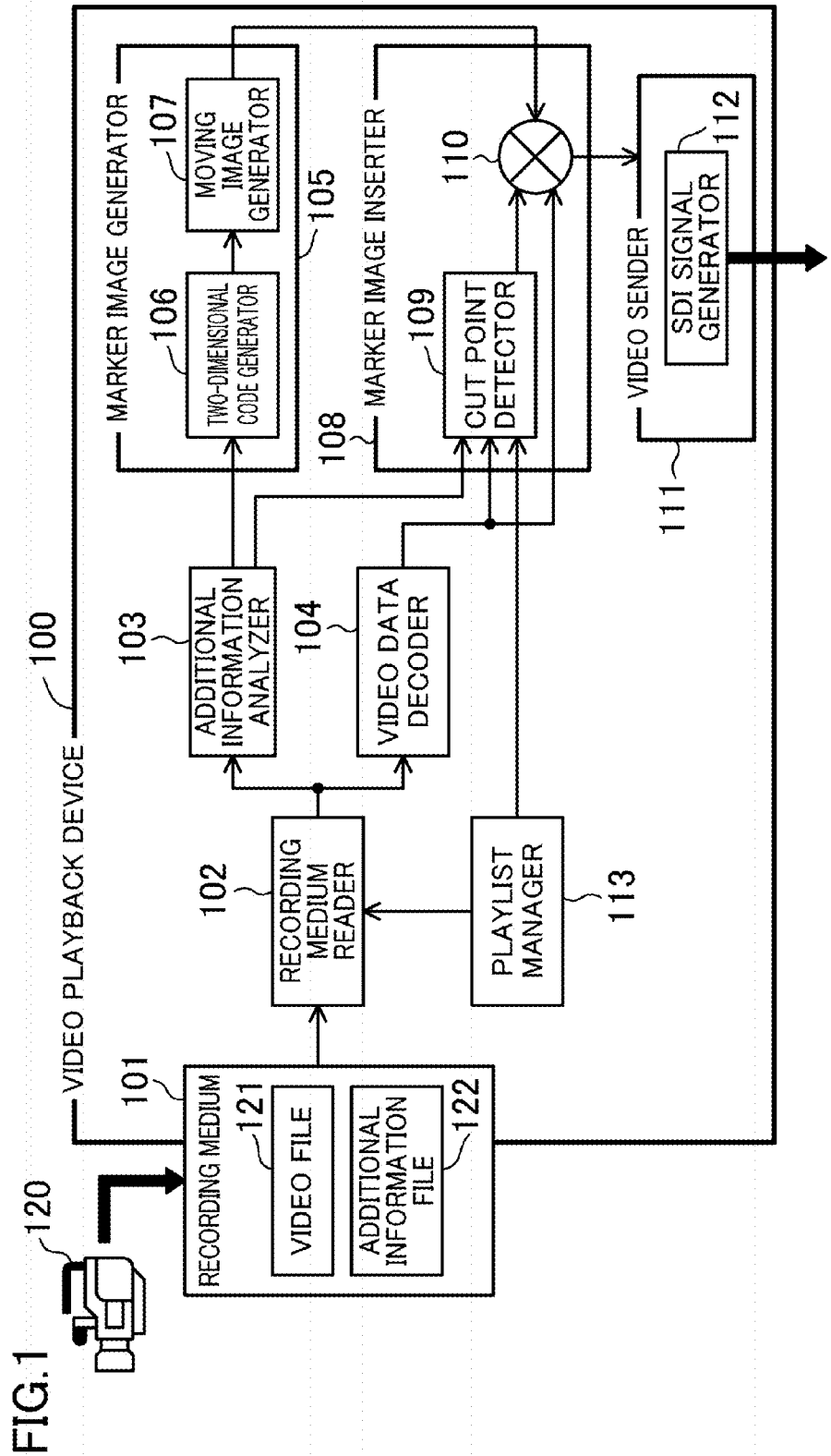
FIG. 1 is a block diagram of a video playback device according to a first embodiment.

Firstly, a configuration of a video playback device will be described. FIG. 1 is a block diagram of a video playback device according to a first embodiment. The video playback device 100 plays back a video from a recording medium 101 which stores a captured video and additional information associated with the video.

The video playback device 100 includes a recording medium reader 102, an additional information analyzer 103, a video data decoder 104, a marker image generator 105, a marker image inserter 108, a video sender 111, and a play list manager 113. The video playback device 100 is a device which plays back a video file 121 and an additional information file 122 stored in the recording medium 101 to generate and output a serial digital interface (SDI) signal complying with SMPTE 259M and SMPTE 292M. Files stored in the recording medium 101 are read out through the recording medium reader 102. The read data of an additional information file is transferred to the additional information analyzer 103, and the read data of a video file is transferred to the video data decoder 104. Note that a video file and an additional information file which are to be read out are determined based on a play list managed by the play list manager 113. The recording medium reader 102 sequentially and successively reads out files about videos listed on the play list.

The additional information analyzer 103 extracts necessary information from an additional information file, and transfers the extracted information to the marker image generator 105. Specific examples of the extracted information will be described below.

The marker image generator 105 includes a two-dimensional code generator 106 and a moving image generator 107. The marker image generator 105 converts data received from the additional information analyzer 103 into a two-dimensional code, such as a QR code (registered trademark) specified in ISO/IEC 18004: 2006, using the two-dimensional code generator 106. The marker image generator 105 also converts the two-dimensional code, which is a still image, into video data (hereinafter referred to as a marker image) having a predetermined length (e.g., one frame to about several seconds) using the moving image generator 107. The produced marker image is transferred to the marker image inserter 108. Here, the marker image is defined as an image which shows a marker which allows a computer to read out information embedded therein by image processing.

On the other hand, the video data decoder 104 decodes an input video file when the data of the video file is compressed video data complying with the Moving Picture Experts Group (MPEG) standards or the DV standards. The decoded video signal is transferred to the marker image inserter 108. The marker image inserter 108 includes a cut point detector 109 and a mixer 110.

The cut point detector 109 detects a boundary of a video signal received from the video data decoder 104. Here, the boundary of a video signal is, for example, a detection of video frames corresponding to the start and end points of video files stored in the recording medium 101. A boundary corresponds to a point where associated additional information files are changed. In order to insert a marker image into a video boundary, the mixer 110, when being notified of detection of a cut point from the cut point detector 109, temporarily stops transferring a video received from the video data decoder 104 to the video sender 111, and instead of this, transfers to the video sender 111 a marker image related to an additional information file associated with a video file on the play list which is to be next played back. The video sender 111 includes an SDI signal generator 112. The video sender 111 converts an input video signal into an SDI signal which can be transmitted through a coaxial cable. The SDI signal thus obtained by the conversion is used as a signal input to the transmitter of an RPU described above.

Figure 2:
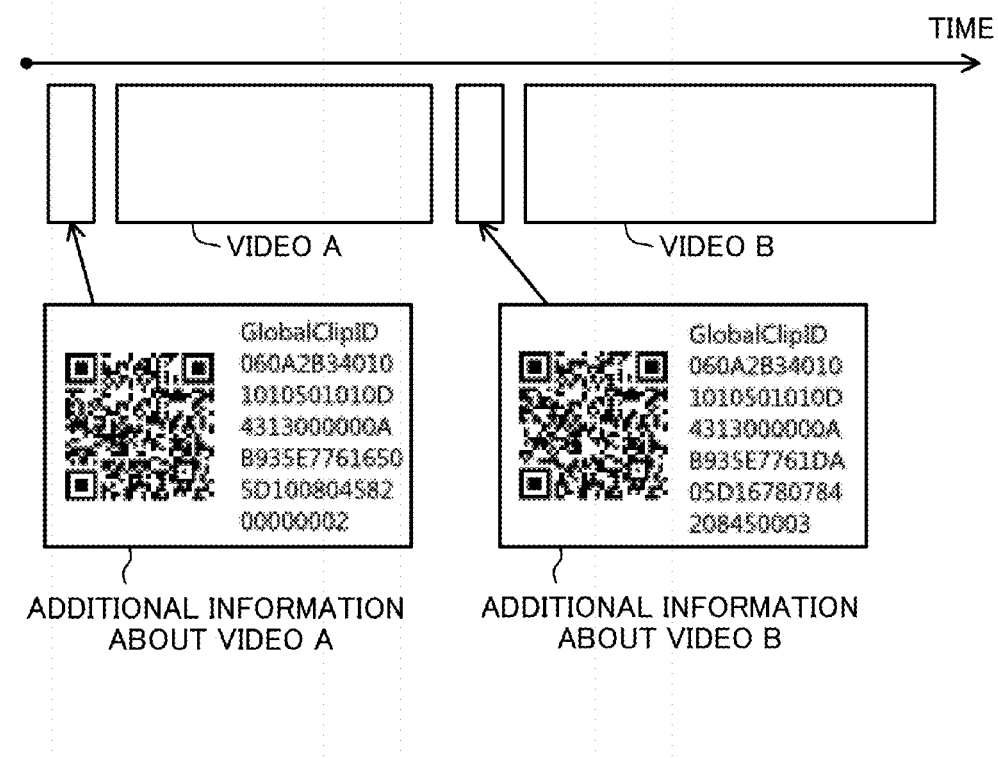
FIG. 2 is a diagram showing example videos which are sent out by the video playback device of FIG. 1.

FIG. 2 shows videos which are transmitted by the above configuration from the transmitter of an RPU to a receiver. A marker image showing a two-dimensional code is inserted in a cut point or boundary between each video file. A two-dimensional code contains additional information associated with a video following the two-dimensional code. In FIG. 2, in addition to a marker image as additional information, a text representing information contained in a two-dimensional code is written on a side of the image of the two-dimensional code in order to allow a human to more easily read the information. Of course, only a marker image is provided as additional information.

Figure 3:
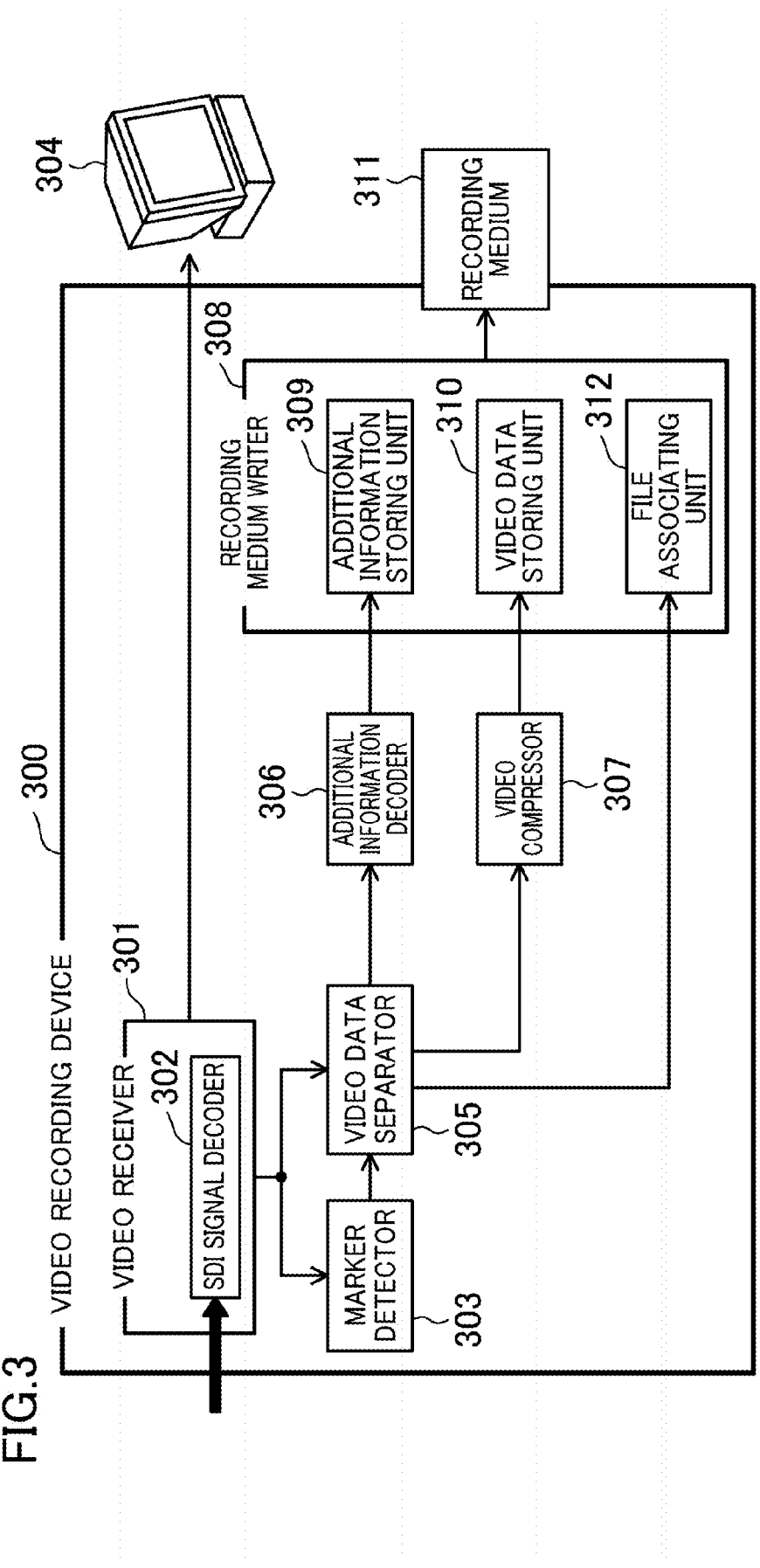
FIG. 3 is a block diagram of a video recording device according to the first embodiment.

Next, a configuration of a video recording device will be described. FIG. 3 is a block diagram of a video recording device according to the first embodiment. The video recording device 300 divides a single input video signal into a plurality of video files, and records the video files.

The video recording device 300 includes a video receiver 301, a marker detector 303, a video data separator 305, an additional information decoder 306, a video compressor 307, and a recording medium writer 308. The video recording device 300 is a device which records to a recording medium 311 a video which is input as an SDI signal via RPU transmission etc.

The video receiver 301 includes an SDI signal decoder 302. The video receiver 301 decodes an SDI signal input to the video recording device 300 into a video, and transfers the video to a monitor 304, the marker detector 303, and the video data separator 305. The monitor 304 is provided to allow the user to view a video input to the video recording device 300 in real time.

The marker detector 303 monitors an input video to determine whether or not the video contains a decodable two-dimensional code. If the marker detector 303 detects such a two-dimensional code in the video and determines that the two-dimensional code contains additional information associated with the video, the marker detector 303 notifies the video data separator 305 of the determination result.

The video data separator 305 continues to transfer input data to the video compressor 307 during the time when there is not the notification from the marker detector 303. On the other hand, when there is the notification from the marker detector 303, the video data separator 305 transfers input data to the additional information decoder 306. The additional information decoder 306 extracts one frame from an input video and decodes a two-dimensional code contained in the frame to obtain the content of an additional information file every time the additional information decoder 306 receives data. The content of the additional information file obtained by the additional information decoder 306 is transferred to an additional information storing unit 309 included in the recording medium writer 308. On the other hand, the video compressor 307 compresses input video data using an algorithm, such as MPEG2, DV, etc. This is performed to reduce the size of video data occupying a portion of the recording medium. The compressed data is transferred to a video data storing unit 310 included in the recording medium writer 308. The recording medium writer 308 includes a file associating unit 312 in addition to the additional information storing unit 309 and the video data storing unit 310.

Figure 4:
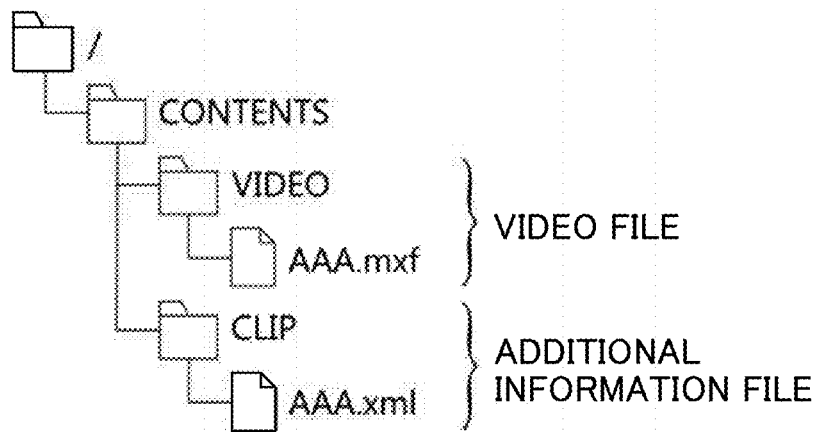
FIG. 4 is a diagram showing an example method for recording a video file and an additional information file according to the first embodiment.

The file associating unit 312 monitors switching of the outputs of the video data separator 305 to detect a correspondence relationship between additional information and video data. The file associating unit 312 also stores additional information and video data which correspond to each other, in association with each other, into the recording medium 311, in a manner which allows the association to be recognized. For example, as shown in FIG. 4, the file associating unit 312 creates a VIDEO folder and a CLIP folder in the recording medium 311, assigns the same file name to a video file and an additional information file which are associated with each other, where the file name is followed by the extension "MXF" (Material eXchange Format: SMPTE377M) for the video file and the extension "XML" for the additional information file, and stores the video file and the additional information file into the VIDEO folder and the CLIP folder, respectively. As a result, the video file and the additional information file are stored in the recording medium 311 with the association therebetween being clearly indicated.

[1-2. Operation]

Operation of the video playback device 100 and the video recording device 300 will now be described, indicating example data having a specific content.

Firstly, operation of the video playback device 100 will be described.

Figure 5:
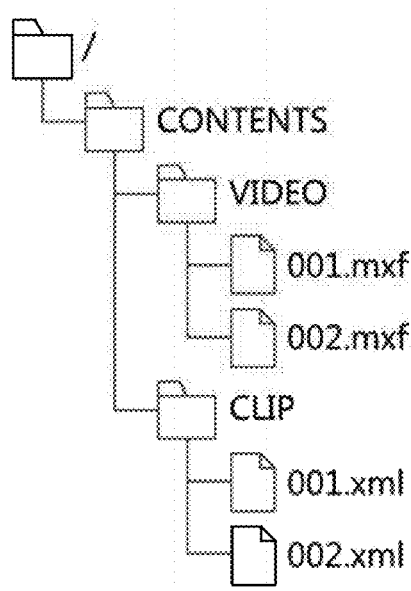
FIG. 5 is a diagram showing a specific example file configuration of a recording medium of FIG. 1.

The recording medium 101 stores the video file 121 and the additional information file 122, which have been recorded by an image capture device 120. The video file 121 and the additional information file 122 are stored in a file system included in the recording medium 101 with the association therebetween being clearly indicated. An example of this situation is shown in FIG. 5. As shown in FIG. 5, the file system in the recording medium 101 has a CONTENTS folder in which all files recorded by the image capture device 120 are stored. There are a VIDEO folder and a CLIP folder in the CONTENTS folder. A video file is stored in the VIDEO folder, and an additional information file is stored in the CLIP folder. When a video file and an additional information file which correspond to each other are stored, the same name followed by different extensions are assigned to the video file and the additional information file. In the example of FIG. 5, a video file named "001.mxf" in the VIDEO folder is paired with an additional information file named "001.xml" in the CLIP folder. By associating files with each other using a file name, the association between the files can be easily determined by a human and a computer.

The video file 121 is stored in a file format called "MXF." MXF is a file format which is commonly used for professional video devices. In contrast to this, the additional information file 122 is stored in a file format called "XML." XML is a markup language which describes a content with considerably high flexibility, and therefore, is suitable for professional video devices which are required to record various items of additional information.

FIGS. 6A and 6B show an example specific content of an additional information file. All additional information is described in the tag "P2Main." Technical parameters, such as video and audio formats, are described in the tag "ClipContent." Additional information, such as the date and time of creation, equipment used in shooting, and a memo, are described in the tag "ClipMetadata."

Particularly important items in additional information of FIGS. 6A and 6B will be described.

Firstly, a "GlobalClipID" is an ID for uniquely identifying a video file associated with this additional information file. As described above, a video file has a file name such as "001.mxf" in a recording medium. The file name cannot be used to uniquely identify the video file in a place away from the recording medium in which the video file is stored. This is more significantly true when the file system MS-DOS (registered trademark), which is employed for SD cards etc., is used as a file system for the recording medium. In this file system, file names have at most eight alphanumeric characters. It is obvious that file names are too short to be uniquely assigned to all video files produced all over the world. It is not unusual that two different recording media store video files which have the same name but contain different contents. Therefore, for example, when data is collected and copied from a plurality of recording media to a single recording medium, conflicting file names need to be changed. In other words, file names are not always unique IDs for videos.

This is why the above "GlobalClipID" is employed. This ID is a character string having a sufficient length of alphanumeric characters. A predetermined algorithm is used to generate this type of IDs so that different IDs can always be assigned to different video files. A specific example of the algorithm for generating GlobalClipIDs is the Unique Material Identifier (UMID): SMPTE 330M, which is a standard for providing material identifiers in the broadcasting business.

Next, "Duration" indicates the length of the video file associated with the additional information file. The unit is a frame. Specifically, in the example of FIG. 6A, the length of a video file is 118 frames.

Next, the tag "StartTimecode" indicates a timecode attached to the start frame of the video file associated with the additional information file. The timecode is time information which is specified in SMPTE 12M-1 and 12M-2 and is used for video signals, and is used to attach time information which monotonically increases to frames in video information. In the example of FIG. 6A, the timecode attached to the start frame of the video file associated with the additional information file indicates 16:05:59:27 (16 hours 5 minutes 59 seconds 27 frames).

There is also the tag "Memos" below the tag "ClipMetadata." The tag "Memos" corresponds to information (here, a text memo) attached to a particular position in time, i.e., a particular frame of the video file associated with the additional information file. Specifically, in the example of FIG. 6B, the tag "Memos" indicates that character information "President" is associated with the 82nd frame from the start frame of the video file. A plurality of the tags "Memo" may be described below the tag "Memos," whereby a plurality of text memos may be described in a video at a plurality of positions in time.

The foregoing information is representative of additional information associated with a video file. As described above, these items of information are considerably useful when an important scene is searched for during editing of a video, when archived video materials are searched for a desired video, etc. However, these items of information are lost when only a video is transmitted.

A case will now be described where the video playback device 100 of the present disclosure is used to successively play back two videos, i.e., video files 001.mxf and 002.mxf, stored in the recording medium 101 to generate an SDI signal, and transmits the SDI signal using an RPU.

The user notifies the play list manager 113 that a video 001 and a video 002 are to be successively played back. Specifically, the user sequentially selects objects to be played back from thumbnails representing video files which are displayed on a display of the video playback device 100, to notify software for managing the order in which videos are played back of videos which are to be played back and the order in which the videos are to be played back.

The play list manager 113 first instructs, based on the notified information, the recording medium reader 102 to read two files which are the video file 001.mxf and the additional information file 001.xml from the recording medium 101. After the video 001 has been processed, the play list manager 113 instructs the recording medium reader 102 to read files (002.mxf and 002.xml) related to the next video 002. A specific example of the recording medium reader 102 may be a file system module of an operating system, such as Windows (registered trademark) or Linux (registered trademark). Specifically, a file of interest is read from the recording medium 101 by calling an application programming interface (API) for reading a file which is possessed by the operating system.

Of the files thus read out, the content of the video file 001.mxf is transferred to the video data decoder 104, and the content of the additional information file 001.xml is transferred to the additional information analyzer 103.

The video data decoder 104 is a decoder which is implemented by hardware or software. Video and audio data contained in a file in the mxf format is typically obtained by a predetermined compression process. For example, moving images are compressed using H.264 (ISO/IEC 14496-10), and sounds are compressed using Advanced Audio Coding (AAC): ISO/IEC 13818-7. In order to play back a video file, the video and audio data need to be decoded. Therefore, the video data decoder 104 is required.

On the other hand, the additional information analyzer 103 is software or hardware which extracts necessary information from an additional information file, particularly XML parser software in this example. The additional information analyzer 103 interprets XML sentences shown in FIGS. 6A and 6B to read, for example, that the length of a video file is "118 frames." This information about the length of a video is important information based on which the cut point detector 109 determines the cut point or boundary of a video.

When a two-dimensional code is produced in a subsequent step, then if only a portion of the information contained in an additional information file is used, only information needed in this case is extracted and transferred to the marker image generator 105. This is because, in order to cause the number of characters recorded in a two-dimensional code to fall within the restricted range, information which can be inferred by the receiver may be removed, or redundant information may be removed. Note that, in this example, all the XML sentences of an additional information file are transferred to the marker image generator 105.

Figure 7:
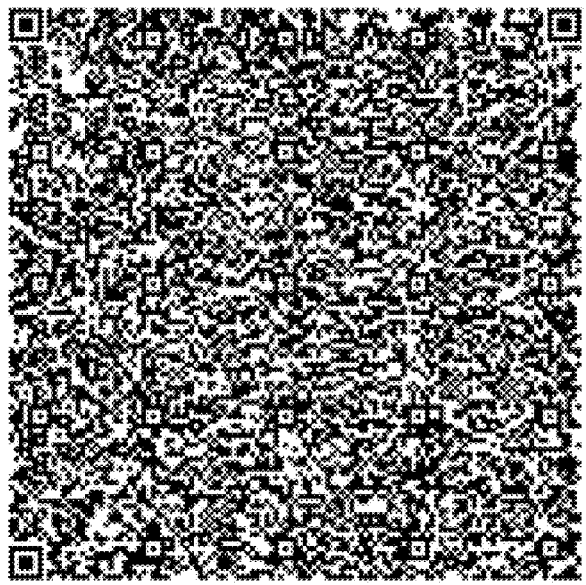
FIG. 7 is a diagram showing an example two-dimensional code representing the additional information file of FIGS. 6A and 6B.

The two-dimensional code generator 106 of the marker image generator 105 receives data from the additional information analyzer 103. The two-dimensional code generator 106 is software or hardware which converts input information into a still image of a two-dimensional code. For example, FIG. 7 shows a two-dimensional code which is obtained by converting XML sentences of FIGS. 6A and 6B of this example.

The still image containing the two-dimensional code thus produced is transferred to the moving image generator 107, which then converts the still image into a moving image having a predetermined length. Specifically, the moving image generator 107 is software or hardware which duplicates frames of the still image of FIG. 7 in an amount corresponding to the predetermined length. As used herein, the "predetermined length" refers to a "period of time during which a two-dimensional code is displayed" which is previously set by the user in the video playback device 100. The predetermined length is one frame to about several seconds in practical use.

The output of the video data decoder 104 and the output of the marker image generator 105 are collected into the mixer 110. The mixer 110 is software or hardware which can switch a video which is output to the video sender 111 between the output of the video data decoder 104 and the output of the marker image generator 105, according to an instruction from the cut point detector 109.

The cut point detector 109 is software or hardware which monitors video data which is input from the video data decoder 104 to the mixer 110 to detect a boundary between each video managed by the play list manager 113. As used herein, the "boundary" with respect to videos refers to, in the context of this embodiment, a boundary between the end frame of a video related to 001.mxf listed on the play list and the start frame of a video related to 002.mxf which is to be next played back. As a specific example operating principle, the boundary between each video may be determined by comparing a length (e.g., the number of frames) of each video listed on the play list obtained from the additional information analyzer 103 with the length of each video input from the video data decoder 104 to the mixer 110, and the mixer 110 may be notified of the boundary as a cut point detection notification.

The mixer 110 is software or hardware which switches, based on the notification from the cut point detector 109, a video which is output to the video sender 111 between the output of the marker image generator 105 and the output of the video data decoder 104. In this embodiment, the mixer 110 first obtains a marker image having the predetermined length related to 001.mxf from the marker image generator 105, and outputs the marker image to the video sender 111. Following this, the mixer 110 obtains video data from the video data decoder 104 and outputs the video data to the video sender 111. As described above, the cut point detector 109 sends the cut point detection notification when the mixer 110 has received the entire video data related to 001.mxf, and therefore, at this time, the mixer 110 switches the source from which video data is obtained back to the marker image generator 105, and obtains a marker image having the predetermined length. The marker image thus obtained is related to 002.mxf. After outputting the marker image having the predetermined length to the video sender 111, the mixer 110 starts obtaining a video from the video data decoder 104 again, and outputs a video related to 002.mxf to the video sender 111. As a result, video data, such as that shown in FIG. 2, is output to the video sender 111.

The video sender 111 outputs the video data through the SDI signal generator 112 to the outside of the video playback device 100. The SDI signal generator 112 is software or hardware which converts an input video signal into an uncompressed digital signal specified in SMPTE 292M etc., and outputs the uncompressed digital signal to a coaxial cable which is connected to a BNC connector included in the video sender 111.

The above operation of the video playback device 100 allows additional information to be associated with a video, in the form of a "marker image," and be output without being lost due to transmission of an SDI signal.

Next, operation of the video recording device 300 will be described.

The video receiver 301 receives an externally input SDI signal. The video receiver 301 is, for example, hardware which includes a BNC connector, and receives a video signal through a coaxial cable connected to the BNC connector. The video receiver 301 also includes the SDI signal decoder 302. The SDI signal decoder 302 is software or hardware which converts an uncompressed digital signal specified in SMPTE 292M etc. back into a video which can be visually recognized by a human. For example, by the decoding result being output to the monitor 304, the content of a video input to the video recording device 300 can be viewed by the user in real time.

A video decoded by the SDI signal decoder 302 is also input to the marker detector 303 and the video data separator 305. The marker detector 303 is software or hardware which determines whether or not the input video contains a two-dimensional code, and if the result of the determination is positive, notifies the video data separator 305 of the determination result. The video data separator 305 outputs a video input from the video receiver 301 to the additional information decoder 306 during the time when the marker detector 303 is sending the notification indicating that a two-dimensional code has been detected, and to the video compressor 307 otherwise. As a result, a marker image and a normal video output by the video playback device 100 are separated from each other.

The additional information decoder 306 is software or hardware which interprets a two-dimensional code contained in a video and converts the content of the two-dimensional code into character information. For example, when an input two-dimensional code is one that is shown in FIG. 7, the additional information decoder 306 obtains character information shown in FIGS. 6A and 6B. The resultant character information is output to the additional information storing unit 309 included in the recording medium writer 308. The additional information storing unit 309 writes the received data as, for example, an XML file to the recording medium 311. A method for determining a file name and a path which are used at that time will be described below.

On the other hand, the video compressor 307 is software or hardware which compresses a video portion and an audio portion of an input video using H.264 and AAC, respectively. The video compressor 307 outputs the compressed data to the video data storing unit 310 included in the recording medium writer 308. At this time, the compressed data is divided every time the video data separator 305 switches the output destination from the video compressor 307 to the additional information decoder 306. Specifically, when it is assumed that the video data storing unit 310 is a file system module of an operating system, a video file is opened when the video data separator 305 switches the output destination from the additional information decoder 306 to the video compressor 307, and a video file is closed when the video data separator 305 switches the output destination from the video compressor 307 to the additional information decoder 306. As a result, for example, a portion A and a portion B of the input video of FIG. 2 are stored as separate video files into the recording medium 311.

Note that the video compressor 307 may, in principle, employ any compression format. Typically, the same compression format as that which is used for the video file 121 stored in the recording medium 101 of the video playback device 100 may be employed, but this is not necessary. This embodiment is directed to a technique of allowing a video stored in the recording medium 101 of the video playback device 100 and a video stored in the recording medium 311 of the video recording device 300 to have the same content. The two video files do not need to be identical in terms of video format or bitwise identical.

As described above, the additional information storing unit 309 and the video data storing unit 310 included in the recording medium writer 308 are software or hardware which writes data as a file to the recording medium 311, and specifically, for example, are a file system module of an operating system. Specifically, by calling an API for writing a file which is possessed by the operating system, a file of interest is written to the recording medium 311.

Figure 8:
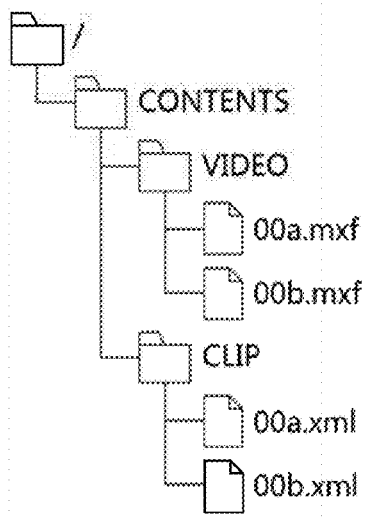
FIG. 8 is a diagram showing a specific example file configuration of a recording medium of FIG. 3.

A file name and a path which are used during writing of a file are determined by the file associating unit 312 included in the recording medium writer 308. The file associating unit 312 is software or hardware which determines, for a pair of a video file and an additional information file, a file name and a path which clearly indicate the association therebetween, and stores the file name and the path into the recording medium 311. For example, the file associating unit 312 monitors switching of the output of the video data separator 305. For example, when the video data of FIG. 2 is processed, the video data separator 305 first sets the output destination to the additional information decoder 306 so that the first two-dimensional code is processed. After the process has been performed on the two-dimensional code, the video data separator 305 next sets the output destination to the video compressor 307 so that the video A is processed. After the process has been performed on the video A, the video data separator 305 switches the output destination back to the additional information decoder 306 so that the second two-dimensional code is processed. At this time, this suggests that the processes on the video A and the two-dimensional code associated with the video A have been completed. The file associating unit 312 handles a pair of pieces of data which are, at this time, stored in the additional information storing unit 309 and the video data storing unit 310 together. In order to clearly indicate this relationship, for example, as shown in FIG. 8, the video file is stored into a VIDEO folder in a CONTENTS folder, and the additional information file is stored into a CLIP folder in the CONTENTS folder, and the same file name excluding an extension is assigned to the video file and the additional information file. In the example of FIG. 8, "00a" is the common file name, and the extension "MXF" is assigned to the video file, and the extension "XML" is assigned to the additional information file. As a result, the relationship between the pair of files can be clearly recognized by a machine and a human's eye.

[1-3. Advantages etc.]

By the above operation, a video file having the same content as that of the video file 121 stored in the recording medium 101 included in the video playback device 100 is recorded into the recording medium 311 included in the video recording device 300. Moreover, an additional information file having completely the same content as that of the additional information file 122 stored in the recording medium 101 included in the video playback device 100 is recorded into the recording medium 311 included in the video recording device 300. The video file and the additional information file are clearly associated with each other. In other words, even when the SDI transfer scheme is employed, a video can be transmitted from the video playback device 100 to the video recording device 300 without loss of additional information.

(Second Embodiment)

[2-1. System Configuration]

In the first embodiment, the marker image generator 105 included in the video playback device 100 encodes the entire content of the additional information file 122 into a two-dimensional code. However, there is an upper limit on the amount of information which can be contained in a two-dimensional code. For example, even a QR code (registered trademark) having the greatest version (version 40) and the lowest error correction level (level L) can store only at most 4296 alphanumeric characters, or only at most 1817 characters if KANA and KANJI characters are also used. This may not necessarily be a sufficient size when a video is associated with a large amount of marks and texts as additional information. When a two-dimensional code having a large amount of information (great version), such as that shown in FIG. 7, is used, the information itself may not be able to be read unless the resolution is maintained to some extent during transmission of a video. The information of a two-dimensional code inserted in a video is lost during the course of communication, for example, if the resolution of the screen is reduced, poor analog modulation is included, encoding is performed at a high compression ratio, etc.

To address this problem, a two-dimensional code having a smaller version may be used, or a two-dimensional code having a higher error correction level may be used. This means that the amount of information which can be contained in a two-dimensional code is reduced.

Therefore, only information for identifying a video file may be incorporated into a two-dimensional code contained in a video to be transmitted, and detailed additional information may be separately transmitted and may be then associated with the video file in the receiver. This operational form will now be described.

Figure 9:
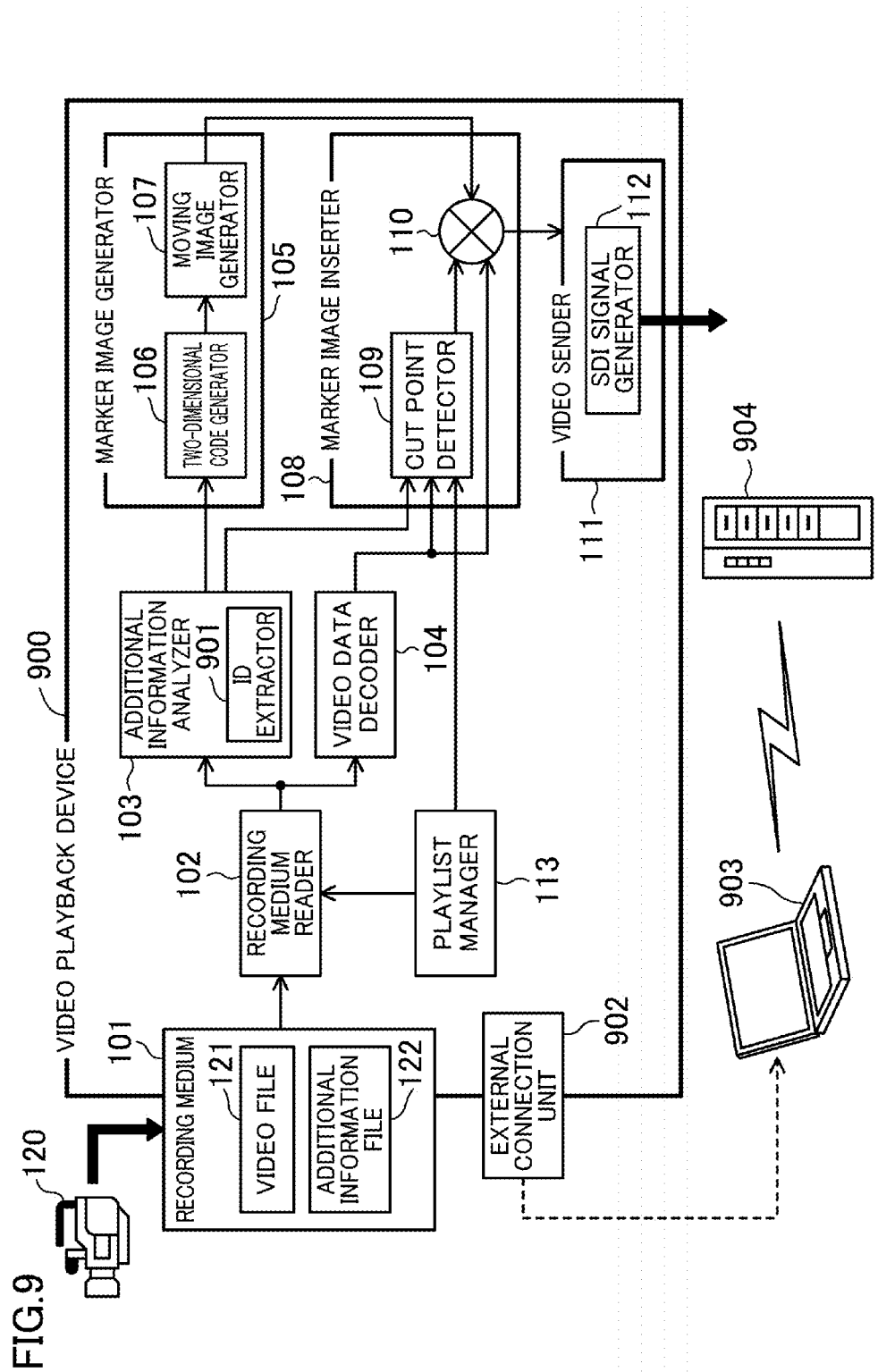
FIG. 9 is a block diagram of a video playback device according to a second embodiment.

FIG. 9 is a block diagram of a video playback device according to a second embodiment. Note that blocks having the same functions as those of blocks of the video playback device 100 of the first embodiment of FIG. 1 are indicated by the same reference characters.

The video playback device 900 of FIG. 9 includes, in addition to the blocks of the video playback device 100 of FIG. 1, an ID extractor 901 in the additional information analyzer 103. The ID extractor 901 selects only information (hereinafter referred to as ID information) required in order to uniquely identify a video file from information extracted by the additional information analyzer 103 from the additional information file 122. The ID information thus selected is transferred to the two-dimensional code generator 106 included in the marker image generator 105, and therefore, the video playback device 900 of this embodiment converts only the ID information into a two-dimensional code, instead of the entire additional information file 122, and then adds the two-dimensional code to a video.

The video playback device 900 also includes an external connection unit 902. The external connection unit 902 allows for reference of a file stored in the recording medium 101 through an external terminal 903.

In addition to the video playback process in the video playback device 900, the user uses the external terminal 903 to obtain and store the additional information file 122 through the external connection unit 902 into the external terminal 903. Thereafter, the user transmits the content of the additional information file 122 from the external terminal 903 to an external server 904.

With the above configuration, a two-dimensional code contained in a video which is transmitted from the transmitter of an RPU to a receiver contains only ID information, while the entire information contained in an additional information file is stored in the external server 904.

Figure 10:
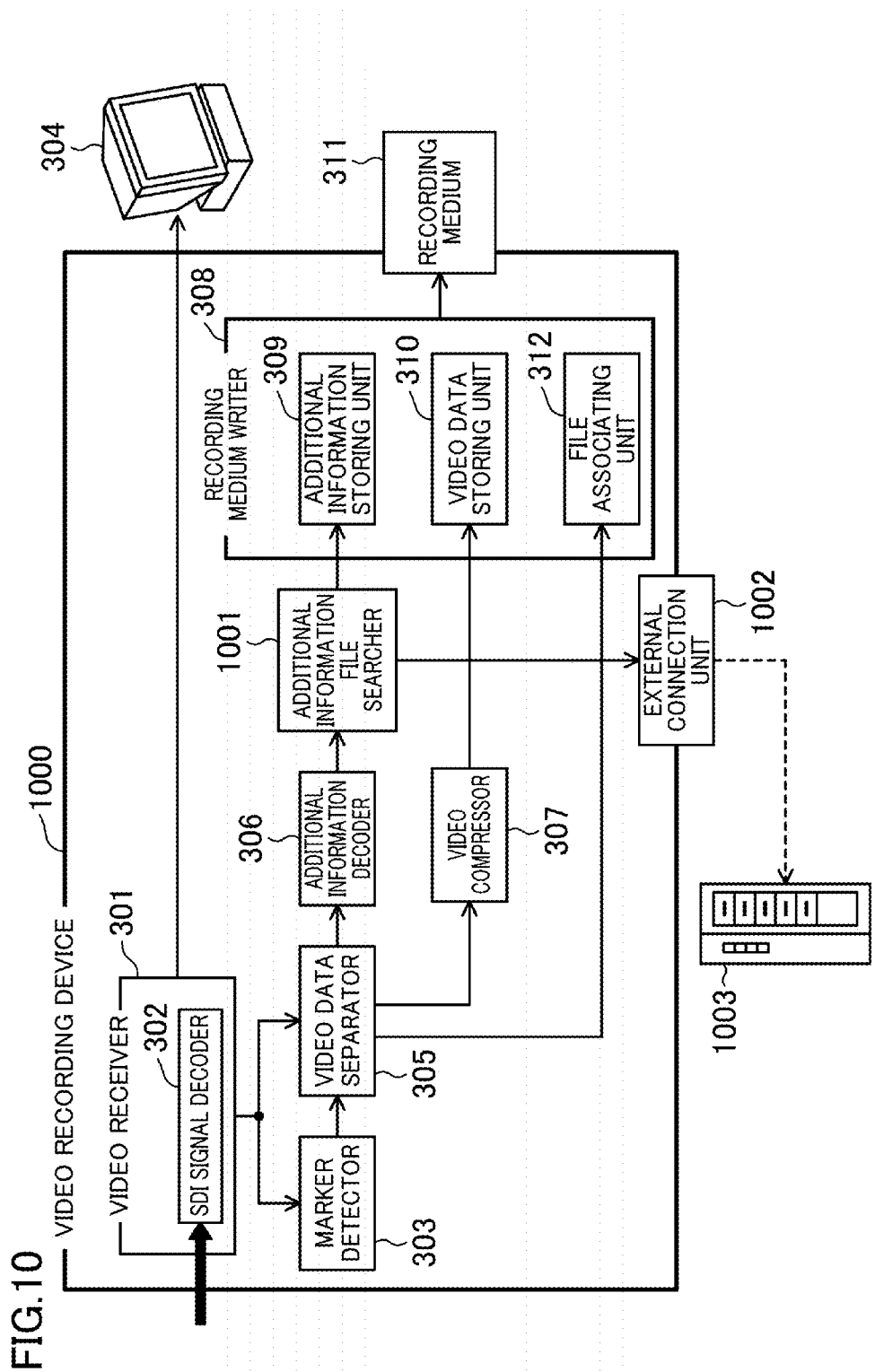
FIG. 10 is a block diagram of a video recording device according to the second embodiment.

FIG. 10 is a block diagram of a video recording device according to the second embodiment. Note that blocks having the same functions as those of blocks of the video recording device 300 of the first embodiment of FIG. 3 are indicated by the same reference characters.

The video recording device 1000 of FIG. 10 includes, in addition to the blocks included in the video recording device 300 of FIG. 3, an additional information file searcher 1001. The additional information file searcher 1001 communicates with the outside of the video recording device 1000 through an external connection unit 1002 included in the video recording device 1000. By this communication, the additional information file searcher 1001 obtains the entire information contained in additional information from a database server 1003 using ID information output from the additional information decoder 306 as a search key. The entire additional information thus obtained is output to the additional information storing unit 309, and is then written to the recording medium 311.

With the above configuration, even when a two-dimensional code inserted in a video received by the video receiver 301 contains only ID information, the entire additional information can be recorded to the recording medium 311.

[2-2. Operation]

Operation of the video playback device 900 and the video recording device 1000 will now be described, indicating example data containing a specific content. Note that the same operation as that of the video playback device 100 and the video recording device 300 of the first embodiment will not be described.

Firstly, operation of the video playback device 900 will be described.

Also in this embodiment, it is assumed that the video file 121 and the additional information file 122 stored in the recording medium 101 are recorded in the same method as that of the first embodiment, and the content of "001.xml" which is an example of the additional information file 122 is an XML file of FIGS. 6A and 6B.

The additional information analyzer 103 is software or hardware which extracts necessary information from an additional information file as described above, particularly XML parser software in this example. In this embodiment, the additional information analyzer 103 further includes the ID extractor 901. The ID extractor 901 is software or hardware which extracts, from an additional information file, only information required in order to uniquely identify a video file associated with the additional information. For example, in a case where the XML file of FIGS. 6A and 6B is an additional information file, the ID extractor 901 is software which extracts only information "060A2B340101010501010D4313000000AB935E776165-05D10080458200000002" which is marked up using the tag "GlobalClipID" from information interpreted by the XML parser. As described in the first embodiment, the tag "GlobalClipID" is information which is used to uniquely identify a video file, where UMID etc. is a generation algorithm.

Figure 11:
FIG. 11 is a diagram showing an example two-dimensional code representing only ID information of an additional information file.

The ID information extracted by the ID extractor 901 is output to the two-dimensional code generator 106 included in the marker image generator 105. Here, it is obvious that the information amount of the ID information is considerably smaller than when the entire XML file is handled. For example, when UMID is used as ID information, the ID information has a binary value of at most 64 bytes, and even when the ID information is converted into hexadecimal character information, the hexadecimal character information has no more than 128 characters. FIG. 11 shows the GlobalClipID which is represented by a QR code (registered trademark) with version 8 and error correction level H.

The video playback device 900 performs operation similar to that of the first embodiment to generate a marker image from a two-dimensional code shown in FIG. 11, and outputs the marker image together with a video associated with the marker image through the video sender 111.

On the other hand, the video playback device 900 includes the external connection unit 902, and therefore, the additional information file 122 stored in the recording medium 101 can be referenced by the external terminal 903. Here, the external terminal 903 is specifically an electronic device, such as a personal computer or a mobile telephone. The external connection unit 902 is hardware for connecting the external terminal 903 to the video playback device 900 and software for controlling the hardware. Specific examples of the hardware include storage type connection terminals, such as a Universal Serial Bus (USB) terminal or an external Serial ATA (eSATA) terminal, and network-type connection modules, such as a wired local area network (LAN), a wireless LAN, and Bluetooth (registered trademark). Specific examples of the software which sends a file stored in the recording medium 101 to the external terminal 903 through the hardware include driver software which allows a USB terminal to recognize the recording medium 101 as a USB mass storage device, and Hypertext Transfer Protocol (HTTP) server software which allows a file in the recording medium 101 to be downloaded through a network.

The external terminal 903 copies the additional information file 122 stored in the recording medium 101 into a recording medium included in itself by the above connection technique or a similar technique. The external terminal 903 also transfers to the external server 904 the additional information file which has been copied to its own recording medium by the above technique. Here, the external server 904 is specifically a server which accepts uploaded data, such as an e-mail server or a web server on the Internet or an FTP server. For example, in the case of an e-mail server, the external terminal 903 may attach an additional information file to an e-mail, and sends the e-mail to a predetermined mail address (one of mail addresses provided by the external server 904).

By the above operation of the video playback device 900 and the external terminal 903, only ID information of additional information associated with a video can be output from SDI in the form of a "marker image" associated with the video, and the entire additional information can be separately accumulated in the external server 904. Because the marker image contains only ID information, a two-dimensional code which is much more highly resistant to error than when the entire additional information is combined with a marker image.

Next, operation of the video recording device 1000 will be described.

Although, similar to the video recording device 300 of FIG. 3, the additional information decoder 306 included in the video recording device 1000 of FIG. 10 decodes a two-dimensional code contained in a video signal, the two-dimensional code contains only ID information in this embodiment.

Therefore, the video recording device 1000 transfers the output of the additional information decoder 306 to the additional information file searcher 1001. The additional information file searcher 1001 is software or hardware which obtains, based on the received ID information, the entirety of additional information from the database server 1003 through the external connection unit 1002 included in the video recording device 1000.

The database server 1003 is a server which includes database software which regularly communicates with the external server 904 through the Internet, and stores the content of an additional information file uploaded to the external server 904, in a database where ID information contained in the additional information file is a key.

For example, when the external server 904 is an e-mail server, the database server 1003 regularly checks an e-mail which has arrived at a predetermined mail address. When a file attached to the received e-mail is interpreted and found to be an XML file corresponding to an additional information file (this determination may be achieved, for example, by finding that the root tag is "P2Main" or that the tag "GlobalClipID" is contained), the entire XML sentences contained in the additional information file are stored into a database, such as Oracle (registered trademark) or DB2 (registered trademark), where the GlobalClipID is a main key. As a result, when ID information is given to the database server 1003, the entirety of additional information associated with a video file indicated by the ID information can be retrieved.

The external connection unit 1002 is hardware for connecting the database server 1003 and the video recording device 1000 together and software for controlling the hardware. The hardware may be, specifically, a network-type connection technology, such as a wired LAN or a wireless LAN. The software which allows the additional information file searcher 1001 to receive the search result of the database server 1003 through the hardware may be, specifically, an HTTP client which gives ID information to an argument of the GET instruction of HTTP, sends the GET instruction to the database server 1003, and obtains the result in HTML or XML, a Structured Query Language (SQL) client which directly sends an SQL sentence via a particular TCP port (e.g., TCP/3306 when the database software is MySQL (registered trademark), etc.) and obtains the result, etc.

By the above operation, the additional information file searcher 1001 can obtain the entirety of additional information corresponding to a received ID information. When this additional information is output to the additional information storing unit 309 included in the recording medium writer 308, the recording medium writer 308 writes an additional information file to the recording medium 311.

[2-3. Advantages etc.]

By the above operation, although only ID information is combined with a video which the video playback device 900 sends from the video sender 111, an additional information file having the same content as that of the additional information file 122 stored in the recording medium 101 included in the video playback device 900 can be recorded into the recording medium 311 included in the video recording device 1000.

(Other Embodiments)

In the foregoing description, the first and second embodiments of the technology disclosed herein have been illustrated. The present disclosure is not limited to these embodiments. The present disclosure is applicable to the embodiments to which changes, replacements, additions, deletions, etc. have been made. Parts of the first and second embodiments may be combined to obtain other new embodiments.

Therefore, other embodiments will now be described.

In the first embodiment, the video sender 111 and the video receiver 301 are connected together by a coaxial cable to exchange an SDI signal. This does not necessarily mean that the signal format is limited to an SDI signal or the communication path is limited to a coaxial cable. In a broad sense, the present disclosure provides a solution to the problem with a transmission path through which "only a video is transmitted." For example, a video may be transmitted by amplitude modulation or frequency modulation, or the signal path may include transmission employing a satellite.

In the first embodiment, a two-dimensional code containing additional information is first displayed, followed by a video associated with the additional information. Alternatively, for example, the order may be reversed. It is obvious that if the same order in which a two-dimensional code and a video are sent is applied to both the algorithm of the cut point detector 109 in the video playback device 100 and the algorithm of the file associating unit 312 of the video recording device 300, the advantages of the first embodiment can be obtained.

In the first embodiment, the file associating unit 312 is software or hardware which determines a file name and a path in the form which clearly indicate the association between a pair of a video file and an additional information file, and stores these files into the recording medium 311 according to the file name and the path. However, a video file and an additional information file may not be necessarily paired. For example, additional information may be embedded in a video file (e.g., additional information is stored in an MXF metadata area). In this case, the file associating unit 312 may be software or hardware which determines a file name and a path for a video file, and specifies a video file in which additional information is to be embedded.

In the second embodiment, the additional information file 122 is transmitted through the external terminal 903 to the external server 904. In the second embodiment, it is important that the additional information file 122 is finally stored into the external server 904. Therefore, for example, the external connection unit 902 may have an FTP client function etc. so that the additional information file 122 is directly uploaded from the video playback device 900 to the external server 904.

In the second embodiment, for the sake of simplicity, the additional information file searcher 1001 is assumed to perform operation of retrieving the entirety of additional information using ID information immediately after receiving the ID information from the additional information decoder 306, but this is not necessary. Alternatively, for example, only ID information obtained by decoding performed by the additional information decoder 306 may be stored as a temporary file in the recording medium 311. After the video recording device 1000 has completely recorded a video file, the additional information file searcher 1001 may scan all temporary files, search for additional information using ID information described in the temporary files, and replace the contents of the files with the entire additional information.

In the second embodiment, the additional information analyzer 103 is assumed to select "information for uniquely identifying a video file" from the additional information file 122 using the ID extractor 901. However, in practical use, a problem often does not occur even when information which cannot always "uniquely" identify a video file. For example, ID information may be information corresponding to the start timecode of a video file (in the case of the additional information of FIGS. 6A and 6B, information "16:05:59:27" marked up by the tag "StartTimecode").

As described above, a timecode is time information which is specified in SMPTE 12M-1 and 12M-2 and is used for a video signal. As described in the standards, the user is allowed to reset the value of the timecode to any arbitrary value at any arbitrary timing (e.g., "00:00:00:00"), and the timecode inevitably takes the same value again at 24-hour intervals without being explicitly reset by the user. The timecode does not contain information unique to a device used in shooting, and therefore, video files which happen to have the same start timecode may be generated by different video capture devices. Therefore, to specify a start timecode does not mean to always "uniquely" identify a video file.

However, video materials are often managed using a timecode because this has been the custom since the time video tape or optical film was used to capture videos. In practical use, it is considered that substantially no problem arises even when the start timecode is used as ID information, because 1) the timecode is almost never explicitly reset on location, 2) if a captured video is managed on a daily basis, the timecode does not take the same value again, and 3) if there are only a small number of cameras, it is considerably unusual to encounter conflicting start timecodes, and therefore, even if automatic addition of additional information fails due to conflicting start timecodes, it does not take a lot of time and effort for the user to visually check the contents of videos. Therefore, even if a device which records a video into the recording medium 101 does not have the function of always generating "unique" ID information, such as UMID etc., the information of the start timecode may be used as ID information. If, in addition to the start timecode, the serial number of a device used in shooting (in the example of FIG. 6B, information marked up by the tag "SerialNo.") or the date and time of shooting (in the example of FIG. 6B, information marked up by the tag "StartDate") is added into ID information, confliction is less likely to occur.

The marker used in the present disclosure is not limited to the above two-dimensional code, and may be a barcode. Alternatively, characters themselves which can be recognized by a human can be used as the marker because embedded information can be read out by image processing performed by a computer.

As described above, embodiments of the technology disclosed herein have been illustrated. To do so, the accompanying drawings and the detailed description have been provided.

Therefore, the components described in the drawings and the detailed description may include not only components essential for achieving the present disclosure, but also non-essential components which are used to illustrate the above technology. Therefore, the non-essential components should not be immediately considered as being essential because those components are described in the drawings and the detailed description.

The above embodiments are for the purpose of illustration of the technology of the present disclosure, and therefore, various changes, replacements, additions, deletions, etc., can be made thereto within the scope of the claims or equivalents thereof.

In the video playback device and the video recording device of the present disclosure, even when a video is transmitted using an existing video transmission path, such as representatively SDI transmission, additional information associated with a video file which is a source of the video is not lost. Additional information to a video can be used in order to pick up important portions from a long video during video editing or to retrieve a video of interest from archived videos, the processing and reuse of a video can be dramatically facilitated.

What is claimed is:

1. A video playback device for playing back a captured video from a recording medium storing the captured video and additional information about the captured video, wherein the captured video includes a plurality of video files each having a corresponding start frame and end frame on a time axis, the video playback device comprising:
    a marker image generator configured to convert the additional information into a marker image showing a marker, the marker being a symbol allowing a computer to read out information embedded therein by image processing;
    a marker image inserter configured to detect a boundary between adjacent video files among the plurality of video files on the time axis, the boundary being a location between the end frame of a preceding video file and the start frame of a subsequent video file on the time axis, and the marker image inserter configured to insert the marker image in the boundary between the preceding video file and the subsequent video file such that the additional information may be extracted from and reproduced separately from the adjacent video files; and
    a video sender configured to successively send out the marker image inserted by the marker image inserter and the captured video.

2. The video playback device of claim 1, further comprising:
    a recording medium reader configured to successively supply a plurality of videos stored in the recording medium to the marker image inserter, wherein
        the marker image inserter includes a cut point detector configured to detect a boundary between each of the plurality of videos supplied by the recording medium reader, and
        the marker image inserter inserts the marker image into the video boundary detected by the cut point detector.

3. The video playback device of claim 1, wherein the additional information contains ID information for uniquely identifying the captured video associated with the additional information.

4. The video playback device of claim 1, wherein the additional information contains a start timecode of the captured video associated with the additional information.

5. The video playback device of claim 1, wherein the additional information contains a position in time of the captured video associated with the additional information and information associated with the position in time.

6. The video playback device of claim 1, wherein the marker is a two-dimensional code.

7. A video recording device for dividing a single input video signal input by a transmitter, from a recording medium in the transmitter, into a plurality of video files and recording the plurality of video files, wherein the plurality of video files each have a corresponding start frame and end frame on a time axis, the video recording device comprising:
    a marker detector configured to detect a marker image inserted as an image in the video signal, the marker image showing a marker and the marker being a symbol allowing a computer to read out information embedded therein by image processing, and the inserted marker image being provided at a position in a boundary between captured video files on a time axis in the single input video signal, the boundary being a location between the end frame of a preceding video file and the start frame of a subsequent video file on the time axis at which a captured video signal if not found;

an additional information decoder configured to decode the marker in the marker image detected by the marker detector to extract additional information to be stored and reproduced separately from the adjacent video files;

a video data separator configured to separate videos before and after the marker image detected by the marker detector;

a video data storing unit configured to store the videos separated by the video data separator into a recording medium in the video recording device;

an additional information storing unit configured to store the additional information extracted by the additional information decoder into the recording medium in the video recording device; and a file associating unit configured to associate the video and the additional information having a correspondence relationship with each other in the recording medium in the video recording device, wherein the video data storing unit stores the videos separated by the video data separator into the recording medium in the video recording device such that a video file stored in the recording medium in the video recording device has the same content as a video file stored in a recording medium in the transmitter, and the additional information storing unit stores the additional information extracted by the additional information decoder into the recording medium in the video recording device such that an additional information file stored in the recording medium in the video recording device has the same content as an additional information file sorted in the recording medium in the transmitter.

* * * * *